March 8, 1960 J. J. HOLLAND ET AL 2,927,403
HYDRAULIC OPERATING AND CONTROL SYSTEM FOR A MACHINE TOOL
Filed Sept. 20, 1957 9 Sheets-Sheet 1

Fig. 1.

Inventors
John J. Holland
Maurice J. Knott
Harold A. Bryant
Donald J. Dunn
by Maxwell Fish
Atty.

March 8, 1960 J. J. HOLLAND ET AL 2,927,403
HYDRAULIC OPERATING AND CONTROL SYSTEM FOR A MACHINE TOOL
Filed Sept. 20, 1957 9 Sheets-Sheet 4

Fig. 23.

United States Patent Office 2,927,403
Patented Mar. 8, 1960

2,927,403

HYDRAULIC OPERATING AND CONTROL SYSTEM FOR A MACHINE TOOL

John J. Holland, Norwood, Maurice J. Knott, Warwick, Harold A. Bryant, Rumford, and Donald J. Dunn, Cranston, R.I., assignors to Brown & Sharpe Mfg. Co., Providence, R.I., a corporation of Rhode Island Application September 20, 1957, Serial No. 685,147

14 Claims. (Cl. 51—92)

The present invention relates to a hydraulic operating and control system for use in a grinding machine having a traversable work supporting table, a grinding wheel, and supporting structure including a support movable to effect relative cross feeding movements of the table and grinding wheel. The invention is herein disclosed in a preferred form as embodied in a surface grinding machine of the general type having a traversing work supporting table, a column support mounted from the base for cross feeding movements relative to the table, and a grinding wheel carriage slidably mounted on the column for vertically positioning movements relative to the table.

The hydraulic system of the illustrated machine includes a hydraulic cylinder for effecting power operation of the table, a hydraulic cylinder for effecting power cross feeding movements of the column support, a hydraulic cylinder which operates through a pick mechanism to effect a stepped power downward feeding movement of the grinding wheel carirage toward the work supporting table, a cross feed nut throw-out actuating cylinder, and a table handwheel throw-out cylinder. The hydraulic controls for operating the table cylinder consist of a table reversing valve, a pilot valve, and a table start and stop valve having cross feed controls, and table throttling positions, all of said valves being mounted in a block and forming part of a hydraulic control panel located in the machine base. The hydraulic control devices for the cross feed hydraulic cylinder include a cross feed reversing selector valve, a cross feed control valve, and a truing and rapid positioning selector valve, which are grouped in a second block forming part of the hydraulic control panel in the machine base.

It is a principal object of the invention to provide an improved hydraulic system for a grinding machine having a simplified and improved construction and arrangement of the hydraulic operating controls to provide for increased efficiency and safety in the operation and control of the machine.

In accordance with the invention an improved manual table start and stop control valve is provided having a stop position, a cross feed operating position, and a table run position. Operating connections are provided between the table start and stop valve and the cross feed hydraulic cylinder including a truing and rapid positioning selector valve manually shiftable from an intermediate neutral position to effect a cross feeding movement of the column support at either of two fixed truing and fast traverse rates.

The arrangement of the table start and stop valve, and cross feed truing and fast traverse selector valve is such that cross feed operation of the column support is effected at the predetermined fixed truing and fast traverse rates only when the table start and stop valve has been turned to the cross feed operating position, and then only when the cross feed truing and rapid traverse selector valve is then turned to the desired operating position.

Further in accordance with the invention means associated with the start and stop valve are provided including an adjustable throttle stop element which may be set to any desired table speed and which permits the operator to close or to shift the table start and stop valve to the cross feed control position, and at any time thereafter to return the table start and stop valve to precisely the same throttle setting.

Further in accordance with the invention an interlock is provided between the table start-stop valve and the cross feed truing and rapid traverse selector valve which is constructed and arranged to permit the table start and stop valve to move to any open table throttle position only when the cross feed selector valve is in its neutral position, and which permits the cross feed truing and rapid traverse selector valve to be moved to either of its operating positions only when the table start and stop valve is either in its stop position or in the adjacent cross feed operating position.

With the above and other objects in view as may hereinafter appear the several features of the invention consist also in the devices, combinations and arrangement of parts hereinafter described and claimed which together with the advantages to be obtained thereby will be readily understood by one skilled in the art from the following description taken in connection with the accompanying drawings in which:

The invention is herein disclosed as embodied in a surface grinding machine of the general type having a base 30, a table 32 adapted for traversing movement on ways 34, 36 on the base, a cross slide which takes the form of a column support 38 which is mounted on ways on the base 30 for forward and back movement with relation to the table, and a grinding wheel carriage 42 which is adapted for vertical movement on ways formed on the column support 38.

The carriage 42 provides support for a forwardly extending arbor 44 on which is mounted a grinding wheel 46. The arbor 44 at its rear end is connected by a pulley drive 48 with an electric motor 50, also mounted on the carriage 42.

Figure 4:
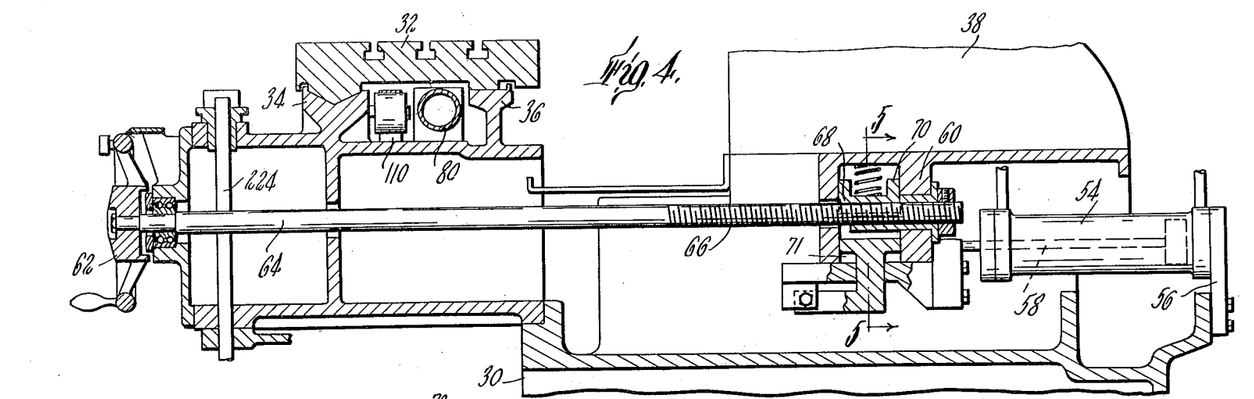
Fig. 4 is a sectional view taken on a line 4—4 of Fig. 1 illustrating particularly the power and manual cross feed driving connection for moving the column support, and the hydraulically operated manual cross feed throw out mechanism by means of which the manual cross feed is disconnected.

Cross feeding movements of the column support 38 and grinding wheel 46 supported thereby are effected alternatively by hydraulically operated power means and by hand operated mechanical means. For hydraulic operation of the column support 38 a hydraulic cylinder 54 is provided as best shown in Fig. 4 secured at its rear end to a vertically extending bracket 56 mounted from the base 30 and provided with a piston 58 which is connected to a downwardly extending bracket 60 formed on the underside of the column support 38. Cross feeding movements are imparted to the column support 38 by means of a handwheel 62 secured to the forward end of a rotatable shaft 64 mounted in the base. The shaft 64 is formed with a screw thread 66 which engages with a half-nut 68 formed in a recess 69 cut through a vertically shiftable plunger 70 of a cross feed nut throw-out hydraulic cylinder 71 which forms an integral part of the column support 38.

Figure 5:
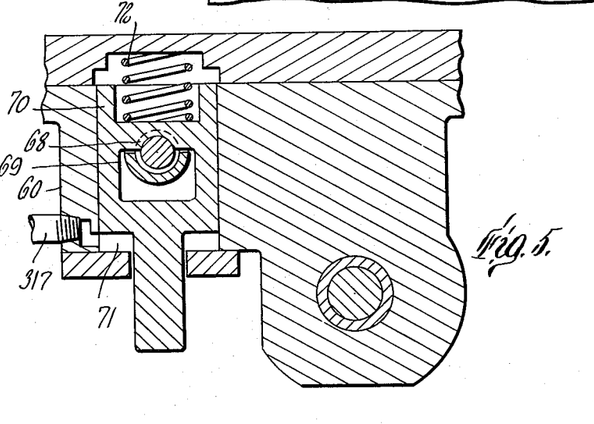
Fig. 5 is a sectional view taken on a line 5—5 of Fig. 4 illustrating on a somewhat enlarged scale the hydraulically operated cross feed nut throw-out mechanism.

The plunger 70 and half-nut 68 are normally held in a depressed screw thread engaging position as shown in Fig. 5 by means of a compression spring 72 mounted between a recess in the upper end of the plunger 70 and a recess formed in the bracket 60. During operation of the cross slide by hydraulic means the plunger 70 is moved upwardly against the pressure of the spring 72 to disengage the half-nut 68 from the screw thread 66 as hereinafter more fully set forth.

Figure 1:
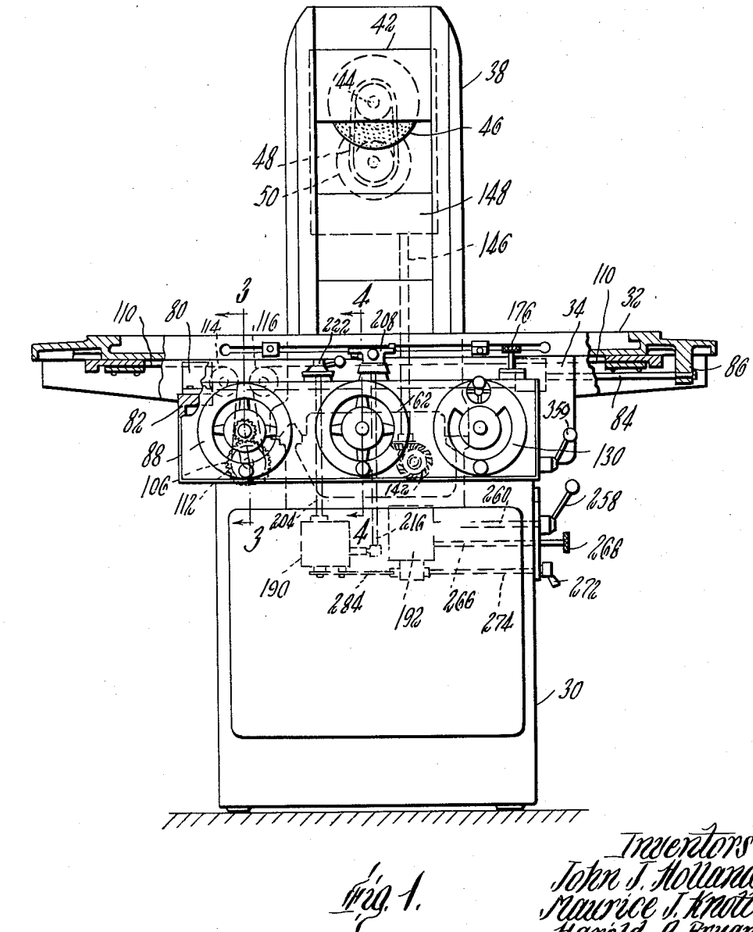
Fig. 1 is a view in front elevation of a surface grinding machine embodying in a preferred form the several features of the invention.
Figure 2:
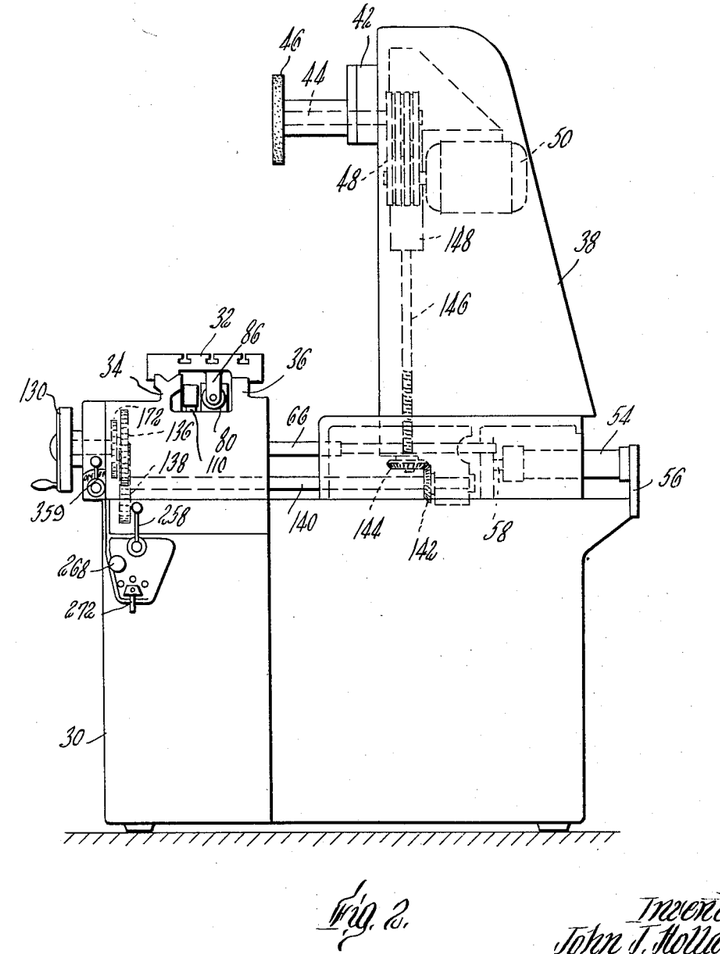
Fig. 2 is a view in right side elevation of the grinding machine shown in Fig. 1.
Figure 3:
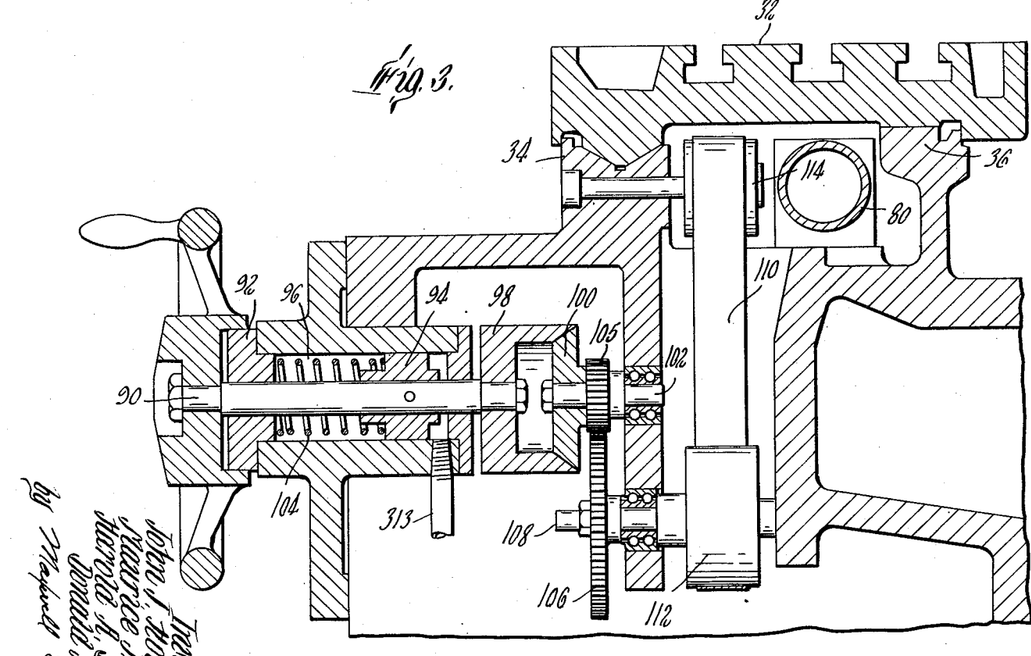
Fig. 3 is a sectional view in side elevation looking from the right taken on a line 3—3 of Fig. 1 illustrating particularly the power and manual driving connections for the table, and the hydraulically operated manual table feed throw-out mechanism by means of which the manual table feed is disconnected.

As best shown in Figs. 1 to 3 inclusive the table 32 is operated by hydraulic means or alternatively through mechanical connections including a manually operated handwheel at the front of the machine. For hydraulically operating the table a table hydraulic cylinder 80 is provided which is connected at the left as shown in Fig. 1 to a bracket 82 on the base, the associated piston 84 being secured to a depending bracket 86 at the right hand end of the table.

Connections for manually operating the table include a table handwheel 88 which is secured to a rotatable and axially shiftable shaft 90 supported toward its outer end in a stationary bearing member 92 and toward its inner end in a plug 94 which forms the plunger of a table handwheel throw-out hydraulic cylinder 96. At its rear end the shaft 90 carries an inwardly beveled ring gear 98 which forms one element of a clutch, the other element being a beveled gear 100 fast on a shaft 102 which is mounted in axial alignment with the handwheel shaft 90. The handwheel shaft is normally maintained in a rearward or engaged position in which clutch gear 98 is in mesh with the clutch gear 100 by means of a compression spring 104 coiled about the shaft 90 and seated at one end against the plunger 94 secured to the handwheel shaft 90 and at its other end against the stationary bearing member 92. During hydraulic operation of the table the handwheel is disconnected by means of hydraulic connections hereinafter to be more fully set forth.

A pinion 105 mounted on shaft 102, meshes with a larger gear 106 on a short shaft 108 mounted in the base. Motion is transmitted to the table 32 from a shaft 108 by means of a strap 110 which passes around a pulley 112 on the shaft 108 and thence upwardly around two pulleys 114, 116 mounted on the base directly beneath the table. One end of the strap passing around the pulley 114 is secured to the table 32 toward its left hand end, and the other end of the strap 110 passing around the pulley 116 is secured to the table 32 at its right hand end as best shown in Fig. 1.

The vertical feed for the grinding wheel carriage as best shown in Figs. 1, 2, 7, 8 and 9 is effected manually through mechanical connections actuated by a vertical feed handwheel 130 and automatically by hydraulically operated devices including a vertical feed hydraulic cylinder 132 which operates through a pick mechanism hereinafter described to effect a stepped downward feeding movement of the grinding wheel carriage.

Figure 7:
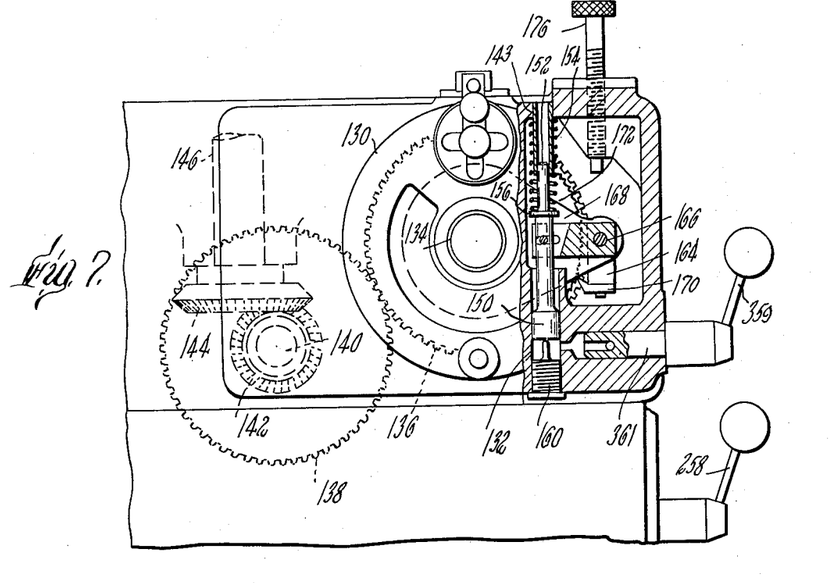
Fig. 7 is an enlarged detail view in front elevation with parts broken away and partly in section taken on a line 7—7 of Fig. 8, and illustrating on a somewhat enlarged scale the vertical feed handwheel mechanism.
Figures 8, 9:
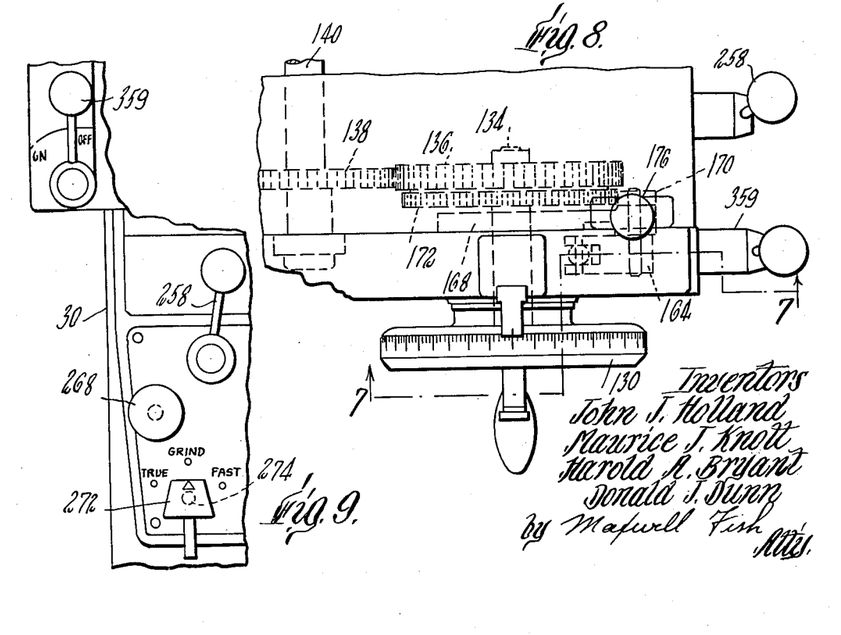
Fig. 8 is a top plan view of substantially the parts shown in Fig. 7.
Fig. 9 is a detail view in side elevation of substantially the parts shown in Fig. 7 looking from the right.

The handwheel 130 is mounted on the forward end of a rotatable vertical feed handwheel shaft 134 which carries at its rear end a large pinion 136 adapted to mesh with a pinion 138 on a parallel shaft 140. As best shown in Figs. 2 and 7 a beveled gear 142 mounted on shaft 140 meshes with a beveled gear 144 secured to the lower end of vertical grinding wheel carriage feed screw 146 which is threaded through a nut 148 fixed to the carriage 42.

The hydraulic mechanism provided for effecting a power down stepped feeding movement of the grinding wheel carriage comprises a hydraulic cylinder 132, which as best shown in Fig. 7, is provided with a vertically disposed plunger 150 and an upwardly extending stem portion 152 which engages within a sleeve bearing member 143 secured to the machine frame. A compression spring 154 coiled about the stem 152 and the sleeve bearing member 143 and seated at its lower end against a collar 156 on the stem 152 and at its upper end against an abutting shoulder of the machine frame, acts to force the plunger yieldably downwardly to its fully retracted position as shown in Fig. 7 which is determined by adjustment of a stop member 160 screw threaded into the lower end of the hydraulic cylinder 132. An upward movement of the plunger 150 acts through a pick mechanism to impart a stepped downward movement to the grinding wheel carriage 142.

The pick mechanism referred to comprises an L-shaped pawl lever 164 pivoted at 166 on a pawl supporting arm or bracket 168 loosely supported to turn on the vertical handwheel supporting shaft 134. A horizontal arm of the pawl lever 164 has a pin and slot connection with the upward extension 152 of the hydraulic cylinder plunger 150. A downward extension of the pawl lever 164 carries a pawl 170 which is arranged to engage with a ratchet wheel 172 secured to the front face of the gear 136 on the shaft 134. Upward movement of the hydraulic cylinder plunger 150 first causes the pawl lever 164 to rock in a clockwise direction from the position shown in Fig. 7 to engage the pawl 170 with the ratchet 172, and thereafter causes the pawl 170, the pawl lever 164 and the bracket 168 to be rotated as a unit counterclockwise about the shaft 134 and to rotate the ratchet 172, shaft 134 and gear 136 in said counterclockwise direction.

The length of each individual feeding movement of the pick mechanism is determined by means of a knurl-headed adjusting screw 176 which is adjustably positioned to engage with and arrest the upward movement of the bracket 168 and associated parts including the pawl lever 164 and the ratchet 172 actuated thereby.

The hydraulic devices by means of which fluid under pressure is supplied to each of the operating hydraulic cylinders of the machine include two valve blocks 190 and 192 which house respectively the several table operating valves and the valves by means of which the cross feeding movements of the column supported slide 38 is controlled. As best shown in Figs. 12 and 14 to 18 inclusive, the table valve assembly 190 comprises a table reversing valve 194 having an axially shiftable valve member 196, a table pilot valve 198 having an axially shiftable valve body 200, and a table start and stop valve 202 having a rotatable valve body 204 shiftable from stop to a cross feed control position and with continued movement into an area providing a range of table throttle positions.

Figure 10:
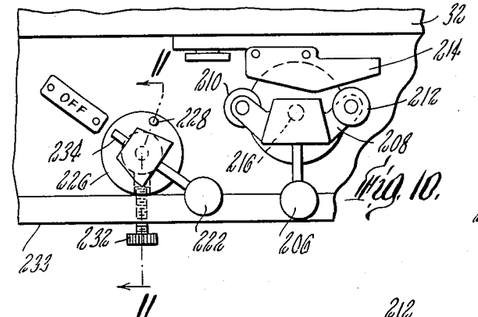
Fig. 10 is a top plan detail view of the table start and stop lever and table reversing lever shown in Fig. 1.
Figure 12:
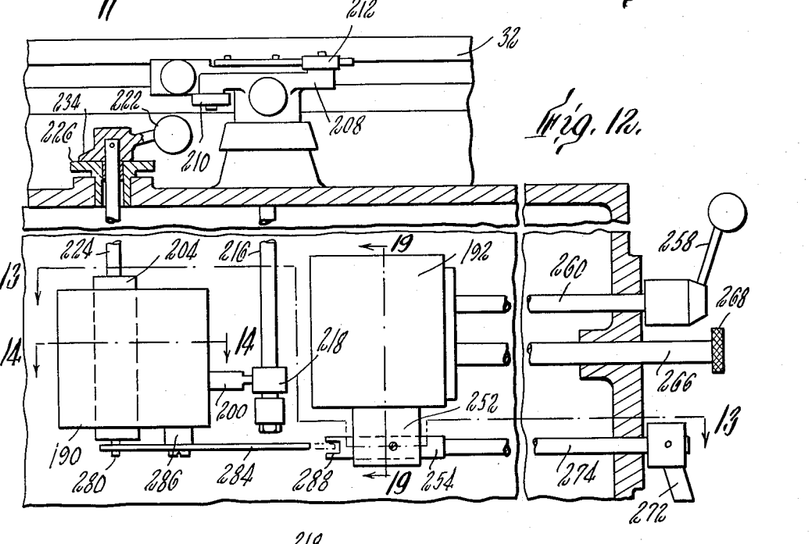
Fig. 12 is an enlarged detail view of the hydraulic control mechanism shown in Fig. 1, but on an enlarged scale, and with portions of the case broken away to show underlying parts.
Figure 13:
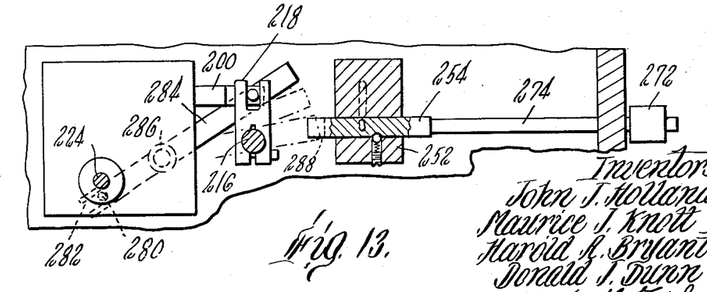
Fig. 13 is a plan section taken on a line 13—13 of Fig. 12 illustrating particularly the interlocking device between the table start and stop lever and the cross feed truing and rapid traverse selector lever.
Figure 14:
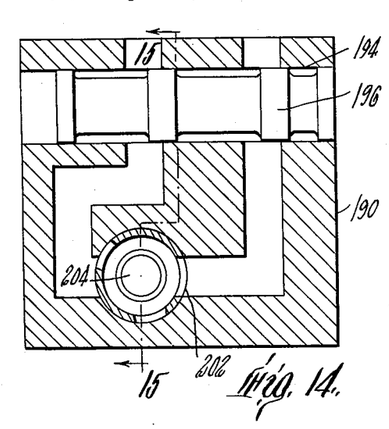
Fig. 14 is a detail sectional plan view on an enlarged scale of the table valve block taken on a line 14—14 of Fig. 12, and illustrating particularly the table reversing valve and the table start and stop valve.
Figure 15:
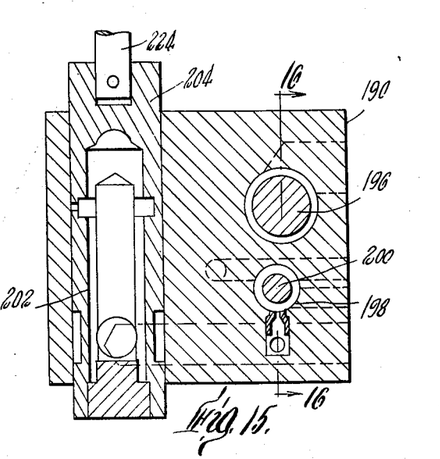
Fig. 15 is a sectional view taken on a line 15—15 of Fig. 14 illustrating particularly the table reversing valve, the table start and stop valve and the pilot valve.
Figure 16:
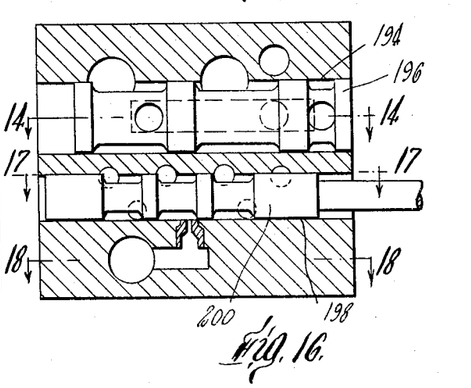
Fig. 16 is a sectional view taken on a line 16—16 of Fig. 15 illustrating particularly the table reversing valve and the table pilot valve.
Figure 17:
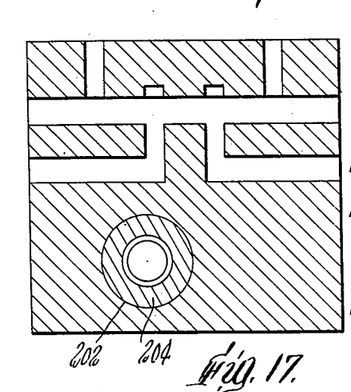
Fig. 17 is a sectional view taken on a line 17—17 of Fig. 16 illustrating particularly the table start and stop valve.
Figure 18:
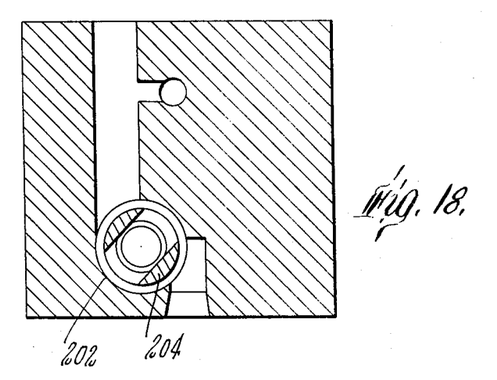
Fig. 18 is a sectional plan view taken on a line 18—18 of Fig. 16 illustrating particularly the table start and stop valve.

Referring specifically to Figs. 10, 12 and 13, reversal of the table motor is effected by means of a manually operable reversing lever 206 or alternatively by means of two table actuated oppositely projecting reversing lever rocker arms 208, having mounted thereon follower rolls 210, 212 arranged to be acted upon by a reversing cam 214 on the forward edge of the table. The manually operable table reversing lever 206 and the table actuated reversing lever rocker arms 208 are secured to the upper end of a vertical disposed rock shaft 216 provided at its lower end with a rearwardly extending arm 218 (see Figs. 12 and 13) having a pin and slot connection with an extension of the pilot valve body 200.

Figure 11:
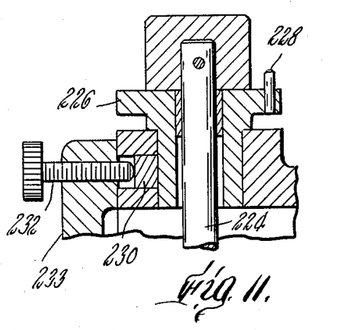
Fig. 11 is a sectional view in side elevation looking from the right taken on a line 11—11 of Fig. 10.

The table start and stop valve of the illustrated construction is controlled by means of a manually operable table start and stop lever 222 which is secured to an upward extension 224 of the start and stop valve body 204, and is adapted to be moved from the Off position of Fig. 10 to successive cross feed control and table throttle control positions. Within the area of movement of the table start and stop lever 222 utilized to effect a throttle control of the table rate of travel, provision is made for a fixed adjustment to which the lever 222 can be returned to permit movement of the start and stop lever to another position and thereafter to be returned to the previously determined throttle position. To this end an adjustable stop device particularly shown in Figs. 10 and 11 is provided which comprises a collar 226, sleeved to turn on the shaft extension 224, and externally supported for rotatable adjustment in a bearing formed in the top surface of the base 30. An upwardly extending stop pin 228 is mounted in the top surface of the sleeve 226 near its outer edge. The downwardly extending sleeve portion of the collar 226 is adapted to be engaged and frictionally held in any position of adjustment by a shoe 230 which is forced against the surface of the sleeve extension of the collar 226 by means of a set screw 232 threaded through the upper edge of a face plate 233 forming part of the machine base 30. When the set screw 232 and shoe 230 are released, the collar 226 and pin 228 can be rotatably adjusted to any desired position. A stop or arm 234 extending horizontally from the hub of the start and stop lever 222 is adapted to be brought into engagement with the pin 228 to arrest further movement of the start and stop lever toward a high speed adjustment of the table travel rate.

The cross feed valve assembly housed in block 192 includes a cross feed reversing selector valve 240 having a rotatably shiftable valve body 242, a cross feed measuring valve 244 having an axially shiftable valve body 246, a cross feed control valve 248 having an axially shiftable valve body 250 and a truing and rapid positioning selector valve 252 having a rotatable body 254.

Figures 19, 20, 21, 22:
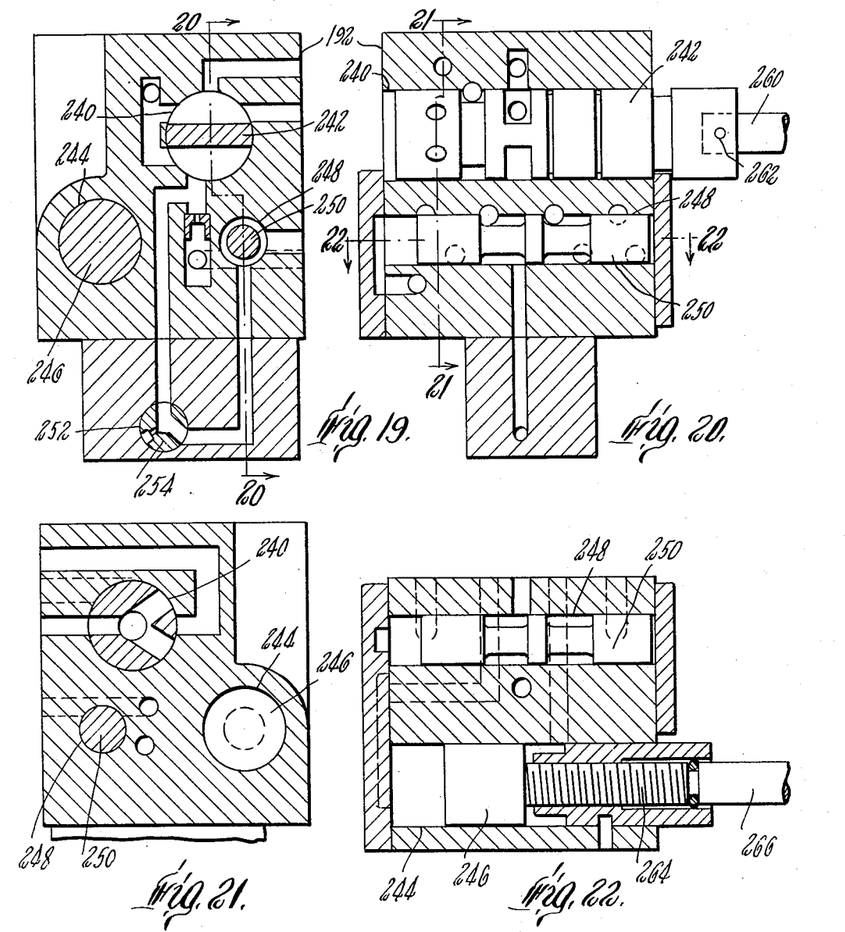
Fig. 19 is a vertical section on a line 19—19 of Fig. 12 of the cross feed valve block illustrating particularly the cross feed reversing selector valve, the cross feed control valve and the truing and rapid positioning selector valve.
Fig. 20 is a sectional view taken on a line 20—20 of Fig. 19 illustrating particularly the cross feed reversing selector valve and the cross feed control valve.
Fig. 21 is a sectional view taken on a line 21—21 of Fig. 20 illustrating particularly the cross feed reverse selector valve, the cross feed control valve, and the cross feed measuring valve.
Fig. 22 is a sectional view taken on a line 22—22 of Fig. 20 illustrating particularly the cross feed control valve and the cross feed measuring device.

Manual controls for the several valves of the cross feed valve assembly include a cross feed reversing hand lever 258 (see Figs. 8, 9, 12 and 20) which is secured to a rock shaft 260 secured by a pin 262 to the valve body 242 of the cross feed reversing selector valve 240. The amount of the cross feeding movement imparted to the column support 38 by the operation of the cross feed measuring valve is determined by means of an adjusting screw 264 (see Fig. 22) forming part of a rock shaft 266 which extends through the side wall of the machine, and is provided at its outer end with a knurled head 268 (Fig. 12). Adjustment of the screw 264 determines the length of travel of the valve body 246, and thus provides a metered supply of fluid under pressure to the cross feed hydraulic cylinder 54. A manual control is provided at the side of the machine for positioning the cross feed truing and rapid positioning selector valve, in the form of a hand lever 272 having three alternative truing, neutral or grind, and rapid positioning positions as indicated particularly in Fig. 9.

The cross feed truing and rapid positioning selector lever 272 is secured to the outer end of the rock shaft 274 and is secured at its inner end to the valve body 254 of the truing and rapid positioning selector valve 252. As best shown in Fig. 13 a spring pressed detent mounted in the valve casing is arranged to engage with any one of three notches formed in the valve body 254 to hold the valve body yieldably in its adjusted position.

In the illustrated construction the table start and stop valve actuating lever 222 is connected by means of an interlocking device with the cross feed truing and rapid positioning selector valve lever 272. Referring particularly to Figs. 12 and 13 the table start and stop valve body 204 which is secured to move as a unit with the table start and stop lever 222 has mounted at its lower end an eccentric pin 280 which rides in a slot 282 in a detent lever arm 284 pivoted at 286 to the underside of the table valve assembly block 190. The other end of the detent lever 284 is arranged for certain positions of the start and stop and throttle valve lever 222 and of the truing and rapid positioning selector lever 272 to ride into a slot 288 in the left hand end of the valve body 254 as viewed in Figs. 12 and 13. So long as the truing and rapid positioning selector lever 272 is in the vertical neutral or grind position of Fig. 9, the table start and stop lever can be shifted from the stop position through the cross feed control position to any throttle table run position, in which the detent lever 284 moves to the lowest dotted line position of Fig. 13 so that it is engaged in the slot 288 in the valve body 254 of the truing and rapid positioning selector valve, thus locking this valve and the associate manual lever 272 in the neutral grind position. If the truing and rapid positioning selector lever 272 is to be moved, it is necessary first to move the table start and stop lever from the table throttle position to the cross feed control position or, if so desired to the stop position which raises the end of the detent lever 284 out of engagement with the slot 288. Now the operator can shift the truing and rapid positioning selector lever 272 to either the true or the rapid positioning position as desired. The table start and stop lever is free to be moved between the Off position and the intermediate continuous cross feed positions, but is prevented from moving into the area of throttle table movement by the engagement of the detent lever 284 against the barrel of the valve body 254.

Figure 23:
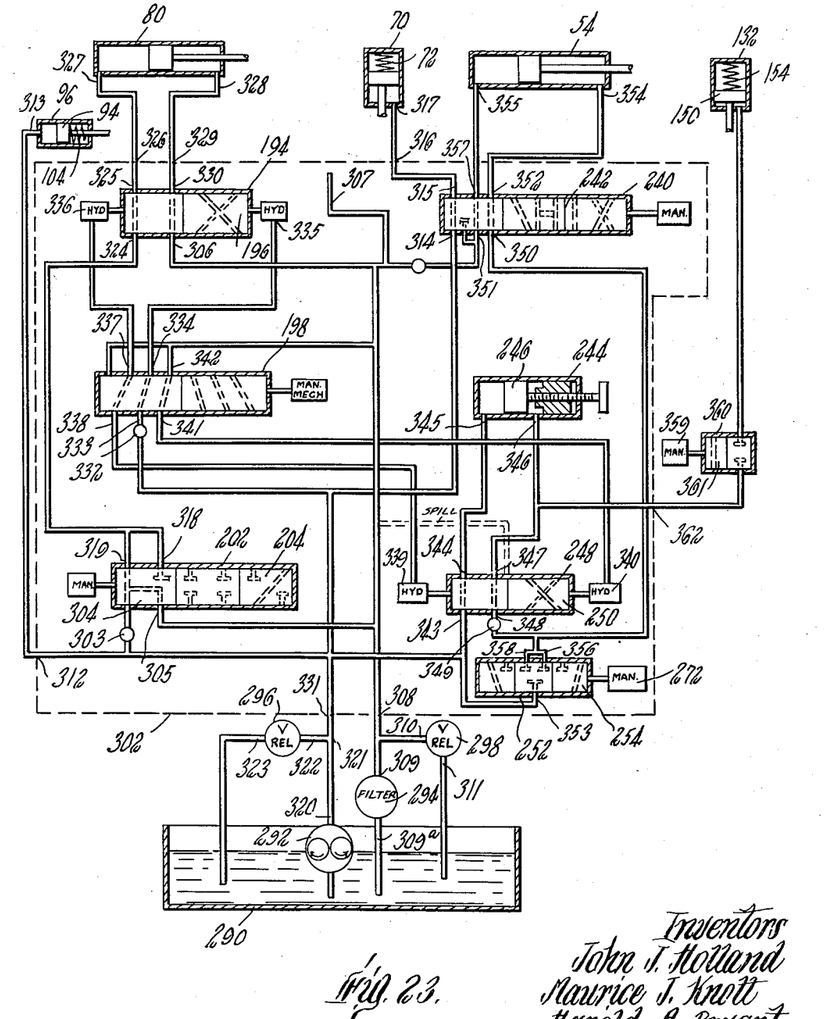
Fig. 23 is a diagram of the hydraulic system of the machine.

The operation of the hydraulic operating and control system of the machine will be particularly described in connection with the diagram Fig. 23 as follows:

For convenience of illustration in Fig. 23 the two valve blocks 190 and 192 indicated in Fig. 1 are considered to be a single panel designated in Fig. 23 at 302. Other elements of the hydraulic system disclosed in Fig. 23 include an oil reservoir 290, an oil pump 292, an oil filter 294 in the oil return system to the reservoir, a high pressure relief valve 296 in a branch return line in the high pressure line from the pump 292, and a low pressure relief valve 298 located in a branch return line to the reservoir.

*Pump started and the table start and stop valve in the Off position*

Oil flows from the pump 292 into the table start and stop and throttle valve 202 past test station 303, and into the center of the rotary table start and stop valve body 204 at port 304. From port 304 oil passes through an outlet port 305 in the valve body 204 and into a port 306 of the table reversing valve 194. From port 306 the oil flows into the panel where some of the oil is available to the lubricating system at port 307. The remainder of the oil leaves the panel at 308 where some of the oil flows through the filter 294 having inlet 309 and outlet 309a to the reservoir 290, and the rest of the oil passes through the low pressure relief valve 298 having inlet port 310 and outlet port 311 to the reservoir 290.

Under these conditions low pressure is connected to the table handwheel through pipe connections 312, 313 and the handwheel 88 is connected to the table 32 by the action of the spring 104 in overcoming the low pressure (see Fig. 3).

Figure 6:
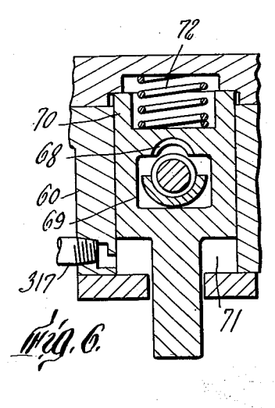
Fig. 6 is a view of the hydraulically operated cross feed nut throw-out similar to Fig. 5, but with the cross feed nut shown in its disconnecting position.

Low pressure oil is also available to the cross feed nut 68 (see Figs. 4, 5, and 6) through ports 314 and 315 in the cross feed selector valve 240 and ports 316 and 317 in the panel and cross feed nut throw-out hydraulic cylinder 70 respectively. Spring 72 overcomes the low pressure and forces the cross feed throw-out plunger 68 and nut downwardly connecting the handwheel 62 and the column support 38.

Both ends of the table cylinder 80 are connected together and into low pressure in this position of the table start and stop valve 202. The table can therefore be moved by manual operation of the table heandwheel 38.

*Table start and stop valve lever 222 and the valve body 204 are set in the middle cross feed truing and rapid positioning control position*

When the table start and stop valve 202 is placed in this intermediate and centered position, oil is blocked from entering the table cylinder, but high pressure oil is made available to the cross feed truing and rapid positioning selector valve 252 for truing or rapid positioning. Oil flows to the center of the table start and stop valve body 204 at 304 as explained in paragraph (1). At point 304, ports 305, 318 and 319 are blocked. The path to low pressure is now blocked so that the oil must now pass through high pressure relief valves through conduits 320, 321, 322 and 323. This high pressure oil is now available to the table handwheel throw-out cylinder 96 through conduits 312, 313. The high pressure oil overcomes the spring 104 and disengages the table handwheel 88 from the table.

The high pressure oil is available to move the column support 38. The path of the oil to the column support 38 will be discussed below.

*Table throttle set in position to give table movement*

Oil flows to the center of the table start and stop and throttle valve body 204 to point 304 as explained above. From point 304 oil passes through the throttle 318 and to port 324 in the table reversing valve body 196. For the valve position shown in the accompanying diagram the oil flows through the reversing valve conduits 324, 325 and travels from the panel to the table cylinder 80 and back to the panel and valve by conduits 326, 327, 328, 329, 330 and 306. The oil then leaves the panel at 308, passes through the filter 294 or the low pressure relief valve 298 and thence to the reservoir 290.

Under these conditions the oil that is in excess of that required to run the table is spilled through the high pressure relief valve 296. This high pressure oil disengages the table handwheel 88 through the knockout conduits 312, 313 and hydraulic cylinder 96.

The table reversing valve 194 is shifted axially back and forth by having high pressure oil fed against alternately one end then the other end of the table reversing valve body 196 each time the table reversing lever 206 is shifted. The reversing lever 206 as above noted in connection with Figs. 10 and 12 is secured to the upper end of a rock shaft 216 which at its lower end carries the lever arm 218 having a pin and slot connection with the pilot valve body 200 which is shifted axially.

In the position shown in the accompanying diagram, Fig. 23, high pressure oil, when available, because of the throttling position, would travel from the port 331 on the panel to the orifice 332 at the pilot valve 198 which is used to control the speed of the reversing valve body 196. From orifice 332 the flow would be through ports 333 and 334 at the pilot valve 198 to port 335 at the end of the reversing valve 194. This shifts the reversing valve body 196, and the oil in the other end of this valve is discharged out of port 336 to ports 337 and 338 of the pilot valve 198. The shifting of the reversing valve body 196 shifts the flow of oil to the opposite end of the table cylinder 80 and reverses the direction of table motion.

The oil being discharged from the end of the table reversing valve 194 goes through the pilot valve conduits 337, 338 and then through the panel to the cross feed control valve port 339. This cross feed control valve body 250 shifts axially and the oil in the other end 340 is brought back through the panel through the port 341 of the table pilot valve and then dumped into low pressure at port 342. In this way the cross feed occurs with the proper timing with respect to the table reversals.

The cross feed control valve body 250 has a smaller diameter and a shorter stroke than the table reversing valve body 196. This means that more oil is discharged from the ends of the reversing valve 194 than can be accommodated by the cross feed control valve body 250. The excess oil is dumped into low pressure through ports marked "Spill" on the diagram.

*Cross feed required at each table reversal*

The flow of oil in the table circuit is the same as previously set forth when the table start and stop valve is set in position to give table movement. High pressure oil is available to the cross feed control valve 248 through conduits 331 and 343. The cross feed control valve is shifted each time the table reverses.

High pressure oil goes from the port 343 to conduit 344 and then to port 345 of the measuring valve 244. The measuring valve body 246 moves through an adjustable stroke under the action of the high pressure oil, and a measured amount of oil leaves port 346 and goes to ports 347 and 348 of the control valve 248. The oil then goes through orifice 349 which controls the speed at which the cross feed occurs and then to port 350 of the cross feed selector valve 240. If the cross feed reversing selector valve 240 is in the middle or neutral position, the oil from the measuring valve 244 is dumped into low pressure at port 351. In the neutral position the cross feed nut throw-out cylinder 70 is connected to low pressure through conduits 315, 314. This connects the handwheel 62 and screw 66 to the cross feed cylinder 54 and the column support can be moved to effect cross feeding movements thereof by hand.

The cross feed reversing selector valve 242 can be turned so that oil from the measuring valve is directed into the cross feed cylinder 54, and the slide 38 will move either in or out a measured amount with each table reversal. For example, if the cross feed reversing selector valve 242 is turned to give cross feed In, the oil from the measuring valve 244 goes through the conduits 350, 352 and 354 and moves the cross slide. Oil from the back side of the cross feed cylinder 54 goes through ports 355, 357 and 351, and into low pressure. If the cross feed reversing selector valve 242 is turned to give cross feed Out the flow is reversed through ports 350, 357 and 355 to the cross feed cylinder and oil is exhausted through ports 354, 352 and 351 into low pressure.

When the selector is shifted to give either In or Out, high pressure oil is connected to the cross feed nut throwout cylinder 70 and the cross feed handwheel 62 and screw 66 are disconnected from the cylinder 54.

*Rapid positioning or truing speed of the cross slide*

When either a rapid positioning or a truing movement of the column supported cross slide 38 is required, the truing and rapid positioning selector lever 272 is turned from its neutral position. The mechanical interlocking device between the table start and stop valve 202 and the truing and rapid positioning valve 254 above referred to will release the latter valve only when the table start and stop valve has been moved from the table throttle position. The shifting of the truing and rapid positioning lever 272 now positively locks the table start and stop valve 202 and associated hand lever 222 against movement to a position where the table can move under power. (See particularly Figs. 12 and 13.)

After the rapid positioning and truing selector lever 272 has been set for either rapid positioning or truing positioning, the table start and stop valve is then turned from the Off position to the intermediate cross feed truing and rapid positioning position, that is, to the point where the interlock provided by the detent lever 284 prevents it from going further. In this position of the table start and stop valve, oil from the pump 292 is prevented from going into low pressure or to the table cylinder so that all the oil from the pump is available for moving the cross slide. The flow is through conduits 320, 321, 331 and 353. The oil goes from port 353 to conduit 358 if the valve is set for rapid positioning and from 353 to 356 if the valve is set for truing. Port 356 has a fixed orifice which gives the required truing speed.

If the cross feed reversing selector valve body 242 is in the neutral position, the oil passing through the truing and rapid positioning selector valve 252 is dumped into low pressure. If the cross feed reversing selector valve body 242 is set for either In or Out, oil at high pressure from the truing and rapid positioning selector valve is directed into the cross feed cylinder 54.

*Down feed attachment*

The down feed cylinder as best shown in Figs. 7 and 23 is controlled by means of a down feed selector valve 360 controlled by a manually operable lever 359 which is shiftable between On and Off positions. The line 347, 346 between the cross feed measuring valve 244 and the cross feed control valve 248 is alternately under high pressure and low pressure each time the table is reversed. It is assumed that the cross feed selector is in the neutral position to avoid interference between the cross and vertical feeds. Line 347, 346 is at low pressure when the cross feed control valve 248 is in the position shown in the diagram, Fig. 23. It is assumed further that the down feed selector valve 360 has been turned to the On position. Under these conditions line 344, 345 is under high pressure as soon as the measuring valve body 246 is moved its full stroke to the right. The reverse line 347, 346 becomes high pressure as soon as the measuring valve body 246 completes its stroke to the left.

As previously noted the downfeed motor consists of the hydraulic cylinder 132 having a spring actuated return valve body 150 which operates through a pick mechanism to impart a stepped down feeding movement to the grinding wheel carriage 42.

The wheel is fed down at one table reversal when high pressure oil in line 346, 347 passing through ports 280, 282 activates the down feed cylinder, moving the valve body 150 upwardly. At the next table reversal the spring 154 returns the down feed valve body 150 against the low pressure now existing in line 346, 347 and the pick 170 is reset for the next down feed.

The down feed cylinder 132 is attached to line 347, 346 from port 362 at the panel.

It will be understood that while the invention has herein been described and illustrated in a preferred form as embodied in a surface grinding machine having a hydraulic operating and control system including hydraulically operated cylinders for effecting power operation of the several supports, the invention in its broader aspects is not limited to the specific construction and arrangement of the several relatively movable supports shown.

The invention having been described what is claimed is:

1. A fluid pressure operating and control system for use in a grinding machine having a traversing work supporting table, a grinding wheel, and supporting structure for said table and grinding wheel including a support movable to effect relative cross feeding movements of the table and grinding wheel which comprises a fluid pressure operated table cylinder, a fluid pressure operated cross feed suport cylinder, a fluid pressure source, operating and control connections between said source and said cylinders including a start and stop valve for the machine shiftable to provide selectively a stop position, a cross feed cylinder operating position, a table throttle run position, and a cross feed selector valve connected between the start and stop valve and the cross feed cylinder having alternatively available neutral and operating positions.

2. A hydraulic operating and control system for use in a grinding machine having a traversing work supporting table, a grinding wheel, and supporting structure for said table and grinding wheel including a support movable to effect relative cross feeding movements of the table and grinding wheel which comprises a fluid pressure operated table cylinder, a fluid pressure operated cross feed support cylinder, a fluid pressure source, opearting and control connection between said source and said cylinders including a start and stop valve for the machine shiftable to provide selectively a stop position, a cross feed cylinder operating position, a table throttle run position, and a fluid pressure connection between the start and stop valve and the cross feed cylinder including a restriction providing a predetermined fixed cross feeding rate of said support.

3. A claim according to claim 2 in which the start and stop valve is shiftable from said stop position to provide selectively in succession a cross feed cylinder operating position, and thereafter a table run throttle position adjustable to effect a plurality of table rates of travel.

4. A hydraulic operating and control system for a surface grinding machine having a base, a traversing work supporting table, a column support slidably mounted from the base for cross feeding movements relative to the table, and a grinding wheel carriage slidably mounted on the machine column for vertical positioning movements relative to the table, which comprises a fluid pressure operated table cylinder connected between the table and the base, a fluid pressure operated cross feed cylinder connected between the column support and the base, a fluid pressure source, and operating and control connections between said source and said cylinders including a start and stop valve for the machine shiftable to provide selectively a stop position, a cross feed cylinder operating position, and a table run throttle position adjustable to effect a plurality of table rates of travel, and a cross feed selector valve connected between the start and stop valve and the cross feed cylinder shiftable between neutral and predetermined fixed cross feeding rate On positions.

5. A hydraulic operating and control system for use in a grinding machine having a traversing work supporting table, a grinding wheel, and supporting structure for said table and grinding wheel including a support mounted to effect relative cross feeding movements of the table and grinding wheel, which comprises a fluid pressuer operated table cylinder, a fluid pressure operated cross feed support cylinder, a fluid pressure source, and operating and control connections between said source and said cylinders including a start and stop valve shiftable from stop position selectively to a cross feed cylinder operating position, and a throttle table run position adjustable to provide a plurality of rates of the table travel, and a cross feed truing and rapid positioning valve connected between the start and stop valve and the cross feed cylinder having a neutral position and alternative truing and rapid positioning positions including means for operating the cross feed cylinder at predetermined fixed truing and rapid positioning rates.

6. A hydraulic operating and control system for a grinding machine having a traversing work supporting table, a grinding wheel, a grinding wheel carriage and supporting structure for said table and grinding wheel including a support movable to effect relative cross feeding movements of the table and grinding wheel, which comprises a fluid pressure operated table cylinder, a fluid pressure operated cross feed support cylinder, a fluid pressure source, operating and control connections between said source and said cylinders including a start and stop valve shiftable to provide alternative stop and table throttle run positions adjustable to provide a plurality of rates of table travel, and an adjustable throttle stop element limiting movement of the start and stop valve between the stop position and a predetermined table run throttle setting in accordance with the adjustment of said throttle stop element.

7. A hydraulic operating and control system for use in a grinding machine having a traversing work supporting table, a grinding wheel, and supporting structure including a support movable to effect relative cross feeding movements of the table and grinding wheel, which comprises a fluid pressure operated table cylinder, a fluid pressure operated cross feed support cylinder, a fluid pressure source, and operating connections between the source and said cylinders comprising a start and stop valve shiftable from a stop position selectively in succession to a cross feed cylinder operating position and to a table throttle run position adjustable to provide a plurality of rates of travel, a cross feed selector valve connected between said start and stop valve and said cross feed cylinder having a neutral position and an On position including a restriction providing a predetermined fixed cross feeding rate of said support, and an adjustable throttle stop element providing a stop setting limiting movement of the start valve from its stop position to a predetermined table run throttle setting in accordance with the adjustment of said throttle stop element.

8. A hydraulic operating and control system for use in a grinding machine having a traversing work supporting table, and supporting structure including a support movable to effect relative cross feeding movements of the table and grinding wheel, which comprises a fluid pressure operated table cylinder, a fluid pressure operated cross feed support cylinder, a fluid pressure source, and operating connections between the source and said cylinders comprising a start and stop valve comprising a rotatable valve body shiftable from a stop position in succession to a cross feed operating position and thereafter to a table throttle run position adjustable to provide a plurality of rates of travel, a hand lever connected to turn with said valve body, a collar mounted concentrically with the hand lever for rotational adjustment relative thereto, and a stop element on said collar limiting movement of said valve body and hand lever to a table throttle run position in accordance with the adjustment of said collar and stop element thereon.

9. A hydraulic operating and control system for use in a grinding machine having a traversing work supporting table, a grinding wheel, and supporting structure including a support movable for effecting relative cross feeding movements of the table and grinding wheel, which comprises a fluid pressure actuated cylinder for effecting power operation of the table, a fluid pressure actuated cylinder for effecting power operation of the cross feeding support, a fluid pressure source, operating and control connections between the said source and said cylinders comprising a start and stop valve shiftable from a stop position selectively to a cross feed cylinder operating position and to a table throttle run position, a cross feed selector valve connected between the start and stop, cross feed control, and table throttle valve and the cross feed cylinder shiftable between neutral and operating positions having a predetermined setting for effecting cross feeding movements at a predetermined rate, and an interlocking device between said start and stop, cross feed control, and table throttle valve and said cross feed selector valve operative for the throttle position of the start and stop valve to prevent movement of the cross feed selector valve from the neutral position, and operative for the operating position of the cross feed selector valve to prevent movement of the start and stop, cross feed control and table throttle valve to a throttle position.

10. A hydraulic operating and control system for use in a grinding machine having a traversing work supporting table, a grinding wheel, and supporting structure for said table and grinding wheel including a support movable to effect relative cross feeding movements of the table and grinding wheel, which comprises a fluid pressure actuated cylinder for effecting power operation of the table, a fluid pressure actuated cylinder for effecting power operation of the cross feeding support, a fluid pressure source, and operating and control connections between said source and said cylinders including a start and stop valve for the machine shiftable to provide selectively a stop position, a cross feed cylinder operating position, and a table run throttle position, a cross feed valve connected between the start and stop valve and the cross feed cylinder shiftable between a neutral position and an operating position having a predetermined setting for effecting cross feeding movements of the support at a predetermined rate, and an interlocking device between said table start and stop valve and said cross feed selector valve operable for the table run throttle position of the start and stop valve to prevent movement of the cross feed selector valve from the neutral position, and operative for the operating position of the cross feed selector valve to prevent movement of the table start and stop valve to the table run throttle position.

11. A hydraulic operating and control system for use in a grinding machine having a traversing work supporting table, a grinding wheel, and supporting structure for said table and grinding wheel including a support movable to effect relative cross feeding movements of the table and grinding wheel, which comprises a fluid pressure actuated cylinder for effecting power operation of the table, a fluid pressure actuated cylinder for effecting power operation of the cross feeding support, a fluid pressure source, and operating and control connections between said source and said cylinders including a start and stop valve having a valve body rotatable from a stop position to a cross feed operating position and thence to a table run throttle position, a cross feed selector valve connected between the start and stop valve and the cross feed cylinder having a valve body rotatable from a neutral position to alternative truing and rapid positioning positions, said selector valve body having a slot formed therein, and an interlocking device between said valves comprising a detent lever arm connected to be moved, upon movement of said start and stop valve body to the table run throttle position, into locking engagement with said slot when said selector valve body is in the neutral position, and, when said selector valve body is in a turned operative position, to strike said selector valve body and thereby to prevent movement of the start and stop valve body to said table run throttle position.

12. A hydraulic operating and control system for a surface grinding machine having a traversing work supporting table, a grinding wheel, and supporting structure for said table and grinding wheel including a support movable to effect relative cross feeding movements of the table and the grinding wheel, which comprises a fluid pressure operated table cylinder, a fluid pressure operated cross feed support cylinder, a fluid pressure source, operating and control connections between said source and said cylinders including a table reversing valve, a table pilot valve having fluid pressure connections with the table reversing valve shiftable between alternative positions to effect successive reversals of the table reversing valve, a start and stop valve shiftable from a stop position successively to a cross feed cylinder operating position and to a table throttle run position in which the table reversing valve and table cylinder are connected to said fluid pressure source, a cross feed reversing selector valve, having a neutral and reverse positions for directing fluid under pressure to opposite ends of said cross feed cylinder, a cross feed measuring valve, a cross feed control valve actuated in opposite directions with each table reversal to supply fluid at high pressure to one end and then to the other end of the measuring valve, and a truing and rapid positioning selector valve connected between the start and stop valve and the cross feed reversing selector valve and cross feed cylinder having a neutral and fixed feeding rate truing and rapid positioning positions.

13. A hydraulic operating and control system for a surface grinding machine having a traversing work supporting table, a grinding wheel, and supporting structure for said table and grinding wheel including a support movable to effect relative cross feeding movements of the table and the grinding wheel, which comprises, a fluid pressure operated table cylinder, a fluid pressure operated cross feed support cylinder, a fluid pressure source, operating and control connections between said source and said cylinders including a table reversing valve, a table pilot valve having fluid pressure connections with the table reversing valve and shiftable between alternative positions to effect sucessive reversals of the table reversing valve, a start and stop valve shiftable from a stop position successively to a cross feed cylinder operating position and to a table throttle run position in which the table reversing valve and table cylinder are connected to said fluid pressure source, a cross feed reversing selector valve, having a neutral and reverse positions for directing fluid under pressure to opposite ends of said cross feed cylinder, a cross feed measuring valve, a cross feed control valve actuated in opposite directions with each table reversal to supply fluid at high pressure to one end and then to the other end of the measuring valve, a truing and rapid positioning selector valve connected between the start and stop valve and the cross feed reversing selector valve and cross feed cylinder having a neutral and fixed feeding rate truing and rapid positioning positions, and an interlocking device between said start and stop, cross feed control, and table throttle valve and said cross feed selector valve operative for the throttle position of the start and stop valve to prevent movement of the cross feed selector valve from the neutral position, and operative for the operating position of the cross feed selector valve to prevent movement of the start and stop, cross feed control, and table throttle valve to a throttle position.

14. A hydraulic operating and control system for a surface grinding machine having a base, a traversing work supporting table, a column support slidably mounted from the base for cross feeding movements relative to the table, and a grinding wheel carriage slidably mounted on the column support for vertical positioning movements relative to the table, which comprises a fluid pressure operated table cylinder connected between the table and the base, a fluid pressure operated cross feed cylinder connected between the column support and the base, a fluid pressure source, and operating and control connections between said source and said cylinders including a start and stop valve for the machine shiftable to provide a stop position, a cross feed cylinder operating position, and a table run throttle position, a table reversing valve, a table pilot valve having fluid pressure connections with the table reversing valve and shiftable between alternate positions to effect successive reversals of the table reversing valve, fluid pressure connections operative for the throttle run position of the start and stop valve to supply fluid pressure from said pressure source through the table reversing valve to the table cylinder, a cross feed reversing selector valve having a neutral and alternate reverse positions for supplying fluid pressure to operate the cross feed cylinder in opposite directions, a cross feed measuring valve, a cross feed control valve and operating connections from the table reversing valve for supplying fluid under pressure to effect a reversal in the position of said control valve with each table reversal, fluid pressure connections from said fluid pressure source operative with each reversal of the cross feed control valve to supply fluid under pressure to first one and then the other end of the measuring valve, a cross feed selector valve connected between the start and stop valve and the cross feed reversing selector valve shiftable between neutral and a predetermined fixed cross feeding rate operating position, a vertical down feed fluid pressure cylinder reciprocable between limiting positions, means actuated by movement of the vertical down feed cylinder in one direction to impart an increment of downward feeding movement to the grinding wheel carriage, and a connection with one side of said measuring valve operative for movement of the table cylinder and cross feed measuring valve in one direction only for effecting a feed movement of said down feed cylinder.

References Cited in the file of this patent

UNITED STATES PATENTS

| | | |
|---|---|---|
| 827,993 | Peirce | Aug. 7, 1906 |
| 2,163,246 | Maglott | June 20, 1939 |